J. J. WALLACE.
HAY ELEVATOR.
APPLICATION FILED SEPT. 16, 1919.
1,371,456. Patented Mar. 15, 1921.
3 SHEETS—SHEET 1.
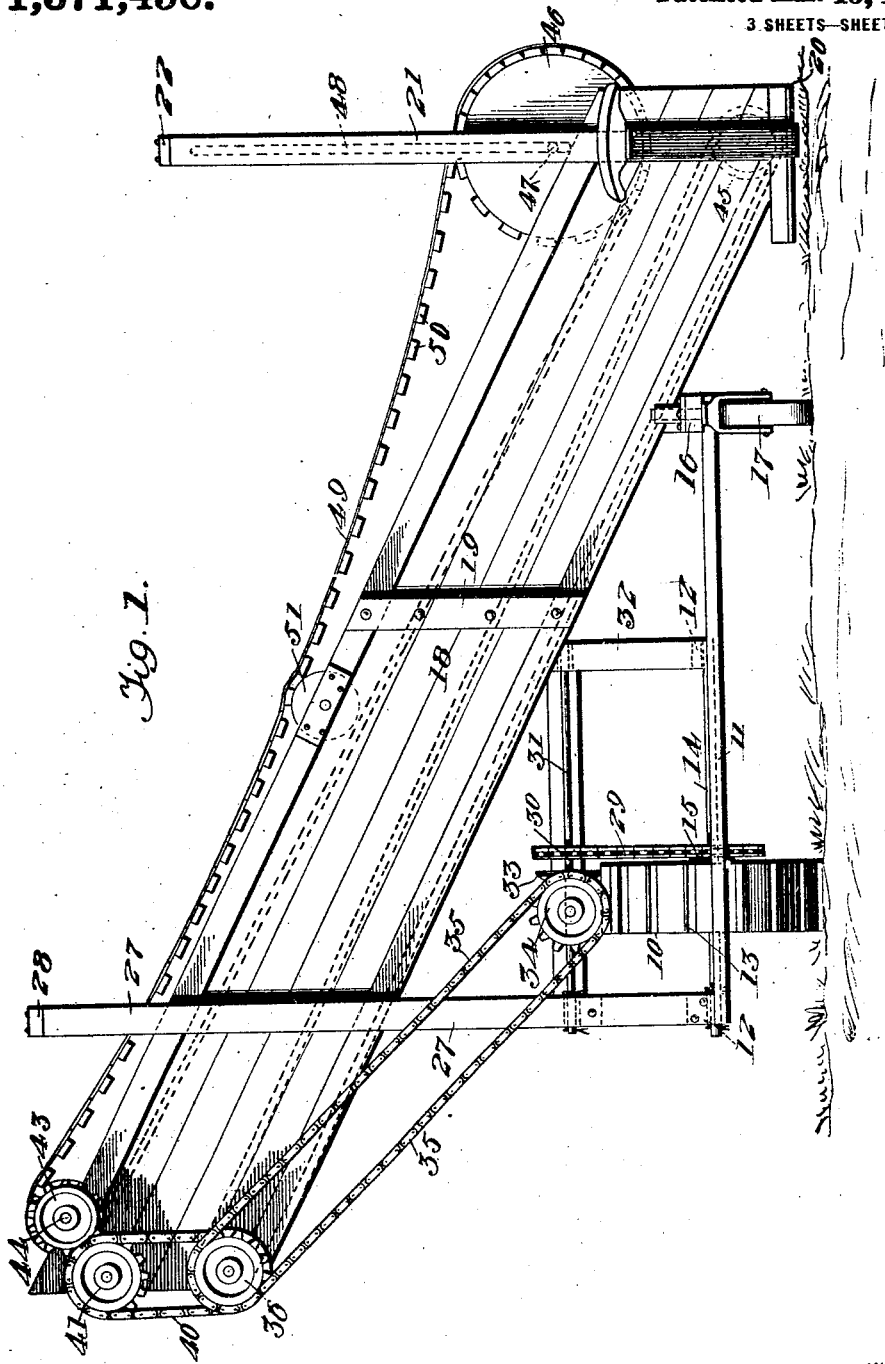
WITNESSES
George C. Myers
INVENTOR
J.J. WALLACE,
BY
ATTORNEYS

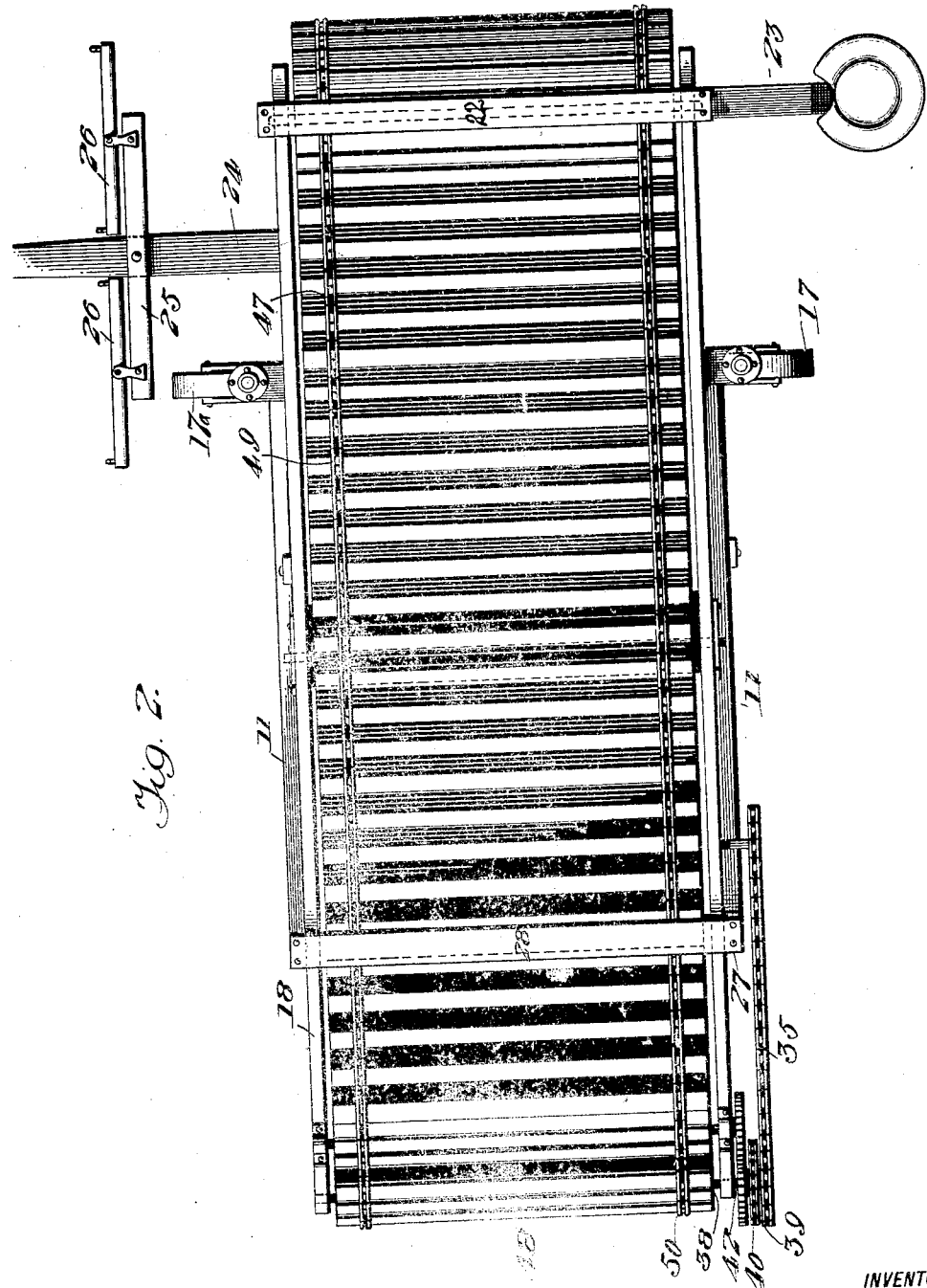

J. J. WALLACE.
HAY ELEVATOR.
APPLICATION FILED SEPT. 16, 1919.
1,371,456. Patented Mar. 15, 1921.
3 SHEETS—SHEET 3.
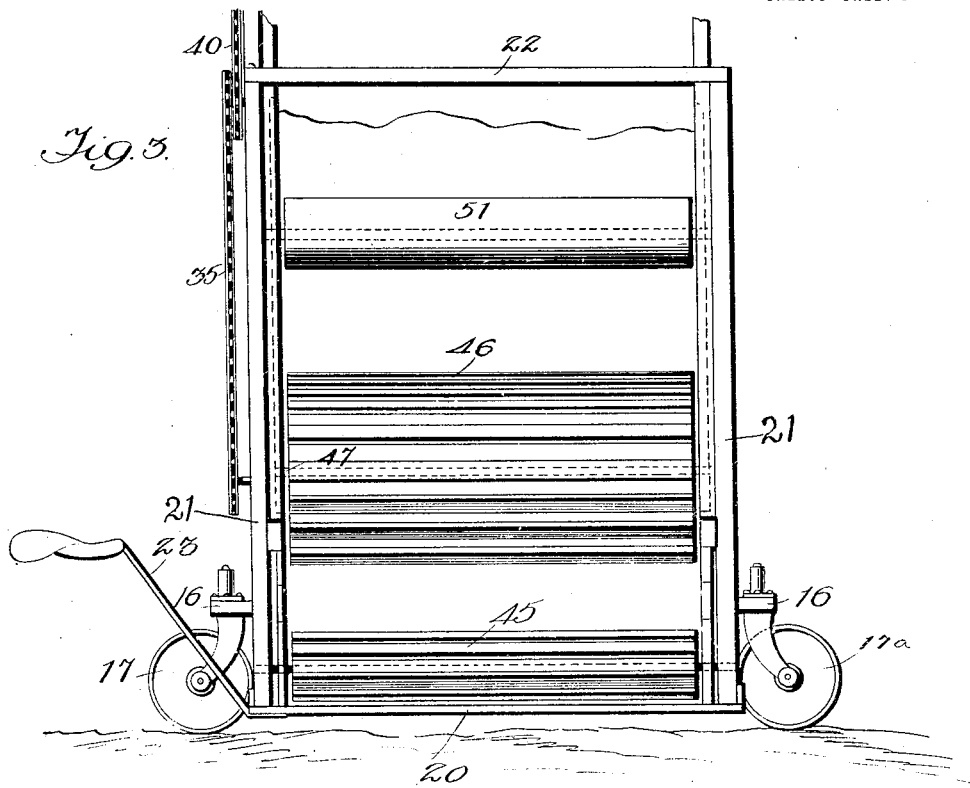
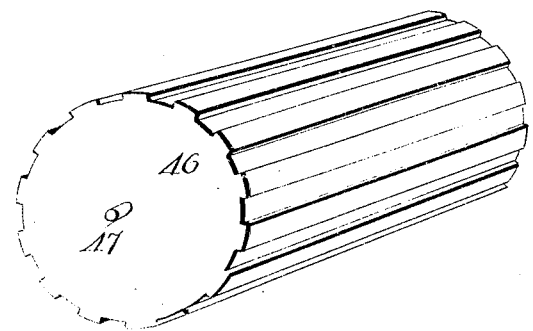
WITNESSES
INVENTOR
J. J. WALLACE,
BY
ATTORNEYS

UNITED STATES PATENT OFFICE.

JOHN JOHANAS WALLACE, OF CALDWELL, IDAHO.

HAY-ELEVATOR.

1,371,456.   Specification of Letters Patent.   Patented Mar. 15, 1921.

Application filed September 16, 1919. Serial No. 324,077.

*To all whom it may concern:*

Be it known that I, JOHN JOHANAS WALLACE, a citizen of the United States, and a resident of Caldwell, in the county of Canyon and State of Idaho, have invented certain new and useful Improvements in Hay-Elevators, of which the following is a specification.

This invention is an improvement in hay elevators and has reference more particularly to traction driven elevating means whereby hay is elevated laterally of the direction of movement of the device.

An object of the invention is to provide a side-delivering hay elevator in which the hay, grain, or seed is taken from a side delivery rake device and deliver the same without waste to a wagon or other receiving member.

Another object is to provide a side delivery elevator in which a pair of endless drapers are used to take and convey the load laterally of direction of travel and dump the same into a delivery wagon or receptacle.

With these and other objects, my invention consists in certain novel features of construction, arrangement and combination of parts as will be hereinafter fully described and pointed out in the claims, reference being had to the drawings, in which—

Figure 1 is a rear elevation of the device;

Fig. 2 is a top plan view of same;

Fig. 3 is a side elevation of same;

Fig. 4 is a perspective view of one of the front draper rollers.

In carrying out my invention I provide a frame carrying a bull wheel 10 the frame comprising side beams 11, cross beams 12, on which is carried in suitable bearings 13 the shaft 14 on which is mounted the bull wheel 10 and also a sprocket wheel 15, which will later be described as to function; the side beams extend horizontally and are connected at one end to the cross beams 16 in which are swiveled the caster wheels 17, and the beams 16 are rigidly secured to the lower face or bottom of an inclined trough 18, having the braces 19 at each side; at the lower end of the trough which is open, a steel plate 20 is placed meeting the floor of the trough, and to the side walls of the trough at its lower end are secured the upright standards 21, which extend considerably above the said walls of the trough and are connected at the top by cross beams 22.

At the entrance end of the trough at one side wall and the front plate is secured a spring seat 23 and to the opposite side of the trough offset slightly from the plane of the seat mount is secured the draft tongue 24, carrying the doubletree 25 to which the team is hitched through the swingletrees 26.

The frame before mentioned and carrying the caster wheels 17 has also secured to it on the side with the draft tongue the caster wheel 17ª and the caster wheels 17 and 17ª with the bull wheel 10 support and carry along the elevator trough.

At the end of the frame at which the bull wheel is placed uprights 27 are secured to the frame and extend upwardly on opposite sides of the trough and are secured thereto to aid in supporting the trough in an inclined position, these uprights extending upwardly beyond the trough and being connected at their upper ends by cross beams 28.

As before stated, a sprocket wheel 15 is mounted on shaft 14 and over this sprocket runs a sprocket chain 29 which meshes with a sprocket 30 carried on shaft 31 carried by the rectangular frame 32 which is secured at one end to the bottom of the trough 18 and at its opposite end to the uprights 27; on the shaft 31 is rigidly mounted a bevel gear 33 which meshes with a similar gear on a shaft in the frame and on the same shaft is a sprocket gear 34, around which passes a sprocket chain 35 running up to idler sprocket wheel 36 carried on a shaft at the outer end of the roller 38 which supports the upper end of the bottom endless draper; the shaft carrying sprocket 36 carries another sprocket 39 over which runs a short sprocket chain 40 which engages a sprocket on a stub shaft 41; this shaft 41 has mounted on it a pinion 42 which meshes with a pinion 43 carried on the end of roller 44 which supports the upper end of the top endless draper. The rollers 38 and 44 are grooved to receive the slats of the respective drapers.

At the feed end of the trough are placed grooved or slatted rollers 45 and 46, the roller 46 being a small one and supporting the lower end of the bottom draper while the roller 46 is somewhat larger than roller 45 and the ends of the shaft 47 on which it is mounted, being slidably held in the vertical slots or grooves 48 in the uprights 21. The lower roller 44 is stationary with respect to the uprights and is mounted adjacent the receiving plate 20 at the entrance of the trough. The two endless drapers are composed of slats 47 and 48 connected in spaced relation near their outer ends by flexible or hinged straps 49 and 50, the slats being of such size that they fit into the grooves of the grooved rollers at the entrance and delivering ends of said drapers. The lower run of the bottom draper travels on the floor of the trough, while the upper run of the top draper travels over a smooth guide roller 51 mounted transversely of the trough intermediate the front and rear ends of said draper, the periphery of the smooth guide projecting above the top edges of the trough.

By means of the gearing coupled up with the bull wheel and the upper ends of the drapers motion is given to the rollers at the upper ends of the drapers causing the upper run of the bottom draper and the lower run of the top draper to always travel upwardly and rearwardly with respect to the feed end of the machine, and the change of speed from the bull wheel to the draper collars is also brought about through this gearing.

The purpose in making the top draper roller larger in diameter than the corresponding roller of the bottom draper is to provide for causing such larger roller to roll over the hay easily and this roller is mounted in the slots in the uprights at the feed end so that it will freely work up and down as the amount of hay fed into the hopper varies.

The operation of the device is as follows: The machine being drawn by the team travels on the bull wheel and the caster wheels; hay is thrown into the lower end of the trough onto the steel plate at that point by the aid of a side delivery rake which may be attached at this place. The traction of the device causes motion to be transmitted to the rollers supporting the upper ends of the two drapers, causing the opposing traveling faces or runs of such drapers to travel upwardly in the same direction to the discharge end of the trough, gravity causing the slats of the lower run of the top draper to contact with the hay that is being carried upwardly on the slats of the upper run of the bottom draper, there being a passageway formed between the top and the bottom draper through which the hay is conveyed. As the runs of the two drapers are more or less flexible this passage can readily vary in area to accommodate varying sizes of bunches of hay that may be propelled or conveyed therethrough.

The upper supporting roller of the top draper is positioned somewhat in advance of the plane of the corresponding roller of the bottom draper, so that the hay that is carried upwardly to the discharge end is freed from the top draper and carried onwardly and then discharged into the wagon or other receptacle, into which the hay is to be loaded.

From the above it will be seen that I have provided a comparatively simple structure and mechanism whereby hay can be expeditiously elevated from the windrows and loaded into wagons, and one which will accommodate varying sizes of bundles without choking up and getting out of order, and which will also elevate the hay from the swath or shock.

I claim:

1. In a device as herein characterized, upper and lower spaced apart opposed endless drapers including spaced apart transverse slats, and means for automatically adjusting the entrance end of said upper draper, said means including laterally spaced apart guide posts and a movable roller having its periphery longitudinally grooved to receive the aforesaid slats, said roller mounted to slide vertically with respect to said guide posts.

2. A device as herein characterized consisting of a frame carrying traction wheels, an inclined trough mounted thereon, upper and lower endless drapers mounted in said trough, spaced apart and supported at the entrance and discharge ends of the trough, means for transmitting motion from a traction wheel to said drapers to cause continuous longitudinal movement of the drapers upwardly and transversely of the path of movement, and means for varying the space between said drapers.

3. A device as herein characterized comprising a frame, a bull traction wheel carried thereby, caster wheels carried by said frame and supporting and guiding the same, an inclined open-top trough mounted on said frame and extending transversely to the direction of travel and over said bull wheel, upper and lower endless drapers rotatably mounted at their front and rear ends in said trough, motion-transmitting means operatively connecting said bull wheel with the rear ends of said upper and lower drapers, to cause continuous upward movement of the lower and upper runs respectively of the top and bottom drapers, and transversely of the direction of travel of the device, a guide roller supporting the upper run of the upper draper intermediate its front and rear ends, the periphery of said guide roller projecting above the upper edges of said trough and maintaining the top run of the upper draper in the same relative position, grooved rollers supporting the lower ends of said top and bottom drapers, the roller supporting the top draper mounted to slide vertically at the entrance end of said trough.

JOHN JOHANAS WALLACE.